United States Patent [19]
Rumez et al.

[11] Patent Number: 5,903,389
[45] Date of Patent: May 11, 1999

[54] OUTSIDE REAR VIEW MIRROR FOR A MOTOR VEHICLE

[75] Inventors: Werner Rumez, Muehlacker; Siegfried Sumser, Stuttgart, both of Germany

[73] Assignee: Daimler-Benz AG, Stuggart, Germany

[21] Appl. No.: 08/910,880

[22] Filed: Aug. 13, 1997

[30] Foreign Application Priority Data

Aug. 13, 1996 [DE] Germany .................. 196 32 620

[51] Int. Cl.⁶ .................................................. G02B 7/18
[52] U.S. Cl. ........................................ 359/509; 359/507
[58] Field of Search .................. 359/507–509, 359/883, 838, 844; 296/91, 152, 153, 180.1; 454/124–131, 135, 142, 164

[56] References Cited

U.S. PATENT DOCUMENTS

| | | | |
|---|---|---|---|
| 3,859,899 | 1/1975 | Mills | 359/509 |
| 4,449,796 | 5/1984 | Janssen et al. | 359/507 |
| 4,898,458 | 2/1990 | McDonald | 359/509 |
| 5,179,470 | 1/1993 | Olson | 359/509 |

FOREIGN PATENT DOCUMENTS

| | | |
|---|---|---|
| 2 017 093 | 10/1971 | Germany . |
| 88 02 009 | 6/1988 | Germany . |
| 40 39 484 | 6/1992 | Germany . |
| 61-36036 | 2/1986 | Japan . |
| 2 048 191 | 12/1980 | United Kingdom .................. 359/509 |

*Primary Examiner*—Thong Nguyen
*Attorney, Agent, or Firm*—Everson, McKeown, Edwards & Lenahan, P.L.L.C.

[57] ABSTRACT

In a rear view mirror for a motor vehicle with a housing connected with an air source, traversed by air guide channels, and holding a mirror glass, with the outlets of the channels being arranged along the edge of the mirror glass to allow air to escape opposite to the direction of forward travel of the vehicle, modified guidance and processing of the escaping air reduces the danger of contamination of the mirror glass by the wind blast as well contamination of the side window associated with the mirror. This is also intended to improve the flow resistance of the mirror as well as its noise behavior. For this purpose, a plurality of separate air channel outlets is provided that are located within a guiding device and/or are equipped with one that produces vorticized air streams that emerge and are stable at each of the air outlets.

11 Claims, 4 Drawing Sheets

OUTSIDE REAR VIEW MIRROR FOR A MOTOR VEHICLE

BACKGROUND OF THE INVENTION

The invention relates to an outside rear view mirror for a motor vehicle.

An outside rear view mirror is known from German patent document DE-OS 2017093 and from DE 88 02 009 U1. As a result of air mass flows guided rearward in the forward travel direction at the edge of the mirror glass out of the rear view mirror, the pressure and flow conditions in the area in front of the mirror glass and the adjoining vehicle side window are to be influenced in such fashion that particularly during rain no, or at least as few as possible, dirt particles strike the mirror glass and side window.

The air flows that emerge from the air guide channels that are closed circumferentially are located horizontally adjacent to one another. This means that air flows escape side by side at approximately the same velocity. Such a flow or flow layer is not especially stable so that changes in position of the flow layer occur frequently. This results in undesired noises and also to the fact that dirt particles, together with the air flow, can reach the mirror glass.

In a similar rear view mirror known from Japanese patent document JP 61 36 036 A, behind the rear view mirror, only air flows with approximately the same velocity adjoin one another.

In a rear view mirror known from German patent document DE 40 39 484 C2, circumferentially closed air guide channels are absent from the edge of the mirror. The elevations and depressions provided on the outer edge for air guidance do not extend over the entire depth of the outside mirror in the flow direction. As a result, the air flows strike an edge at which uncontrolled vortices develop.

SUMMARY OF THE INVENTION

The present invention embeds or shapes the air space located in front of the mirror glass (back flow area) as much as possible into a stable outside air flow in order to avoid strong pressure fluctuations and to produce a specific outflow configuration. In addition, the present invention helps to reduce the flow resistance of the rear view mirror, as well as to reduce in part the driving noise caused by the mirror.

The present invention provides an outside rear view mirror for a vehicle, comprising a housing supporting a mirror glass, a plurality of interior air guide channels within said housing being communicated with an air source and having respective outlets arranged proximate a peripheral edge of the mirror glass, said outlets facing a rearward end of the vehicle, an exterior surface of said mirror housing defining a plurality of exterior channels through which ambient air flows as a result of a forward movement of the vehicle, wherein said interior air guide channels are located laterally between said exterior channels, air flows emerging from the interior air guide channels and the exterior channels being at least partially horizontally adjacent in order to form vorticized air streams emerging from the interior air guide channels.

The design according to the invention is based on the idea of shaping the air that emerges from separate closed air flow channels into stable air flows in the form of vorticized air streams. This is made possible by jacketing with adjacent air flows of higher speed. Such air flows with a higher flow rate occur in the depressions and on the upper outer surface of the channels.

The invention is further based on the idea of protecting the mirror glass of the rear view mirror by a ring surrounding said mirror and composed of vorticized air streams, against dirt reaching the surface of the mirror. Air channel outlets located along the side window generate vorticized air streams of air there to protect the side windows against dirt. In addition, the vorticized air streams, when the vehicle is driving at high speed, avoid the formation of undefined vacuum vortices in the flow behind the rear view mirror, so that a rear view mirror of this kind produces less flow resistance. The manner in which the separately arranged outlets of the air guide channels are designed and/or must be equipped with guiding devices such as vanes and how the emerging air flows out in the form of vorticized air streams is known of itself to the individual skilled in the art of flow so that no further information in this regard is required.

One simple and advantageous measure for producing the vorticized air streams according to the invention consists in profiling the marginal area of the mirror housing in which outlets of air guide channels are provided. The term "profiling" here means that raised and lowered portions are provided through which the air can flow in the travel direction. The air guide channel outlets are located in the elevated areas, each of which has a depression located next to it. With different flow velocities below the lowered areas and those with the elevations, the vorticized air streams that are desired according to the invention are formed.

The air to be guided through the air guide channels can be taken from the interior of the vehicle. Thus for example the air can be taken from a ventilated passenger compartment. In this case the rear view mirror serves as a form of additional exhaust air scoop.

Between the air source and the outlet openings of the air guide channels, collecting and distributing chambers can be provided inside the rear view mirror housing. The openings provided on the front surface of the mirror housing can also blend with ejectors to accelerate the air mass flow.

The air to be supplied to the air guide channels can also be the wind blast itself, and openings can be provided on the front of the mirror housing to allow it to enter the channels. Between the air source and the outlet openings of the air guide channels, collecting and distributing chambers can be provided inside the rear view mirror housing. The openings provided on the front of the mirror housing can also be connected to ejectors to accelerate the air mass flow.

The air flow mass to be conducted through the air guide channels can be controlled deliberately and/or as a function of the wind conditions on the rear view mirror. This can be accomplished by suitable valves. The wind conditions prevailing at the rear view mirror can be detected by sensors by which the air guidance can be controlled or regulated. Especially in the case when the passenger compartment serves as an air source for the air guide channels, a check valve is provided in the connection between the air guide channels and the vehicle interior so that return flow of air in the direction of the passenger compartment is reliably prevented.

As a result of the vorticized air streams that are deliberately produced and aligned according to the invention in the mirror housing on the outer edge of the mirror glass and along the associated side window pane, uncontrolled pressure fluctuations in the area in front of the mirror glass and the adjoining side window pane are reliably avoided. This contributes in particular to a reduction of noise in rear view mirrors that are made relatively large for good visual conditions.

Furthermore, according to certain preferred embodiments, the air supply channels inside the rear view mirror are sound-insulated.

These and other objects, features and advantages of the present invention will become more readily apparent from the following detailed description when taken in conjunction with the accompanying drawings.

DETAILED DESCRIPTION OF THE DRAWINGS

Figure 1:
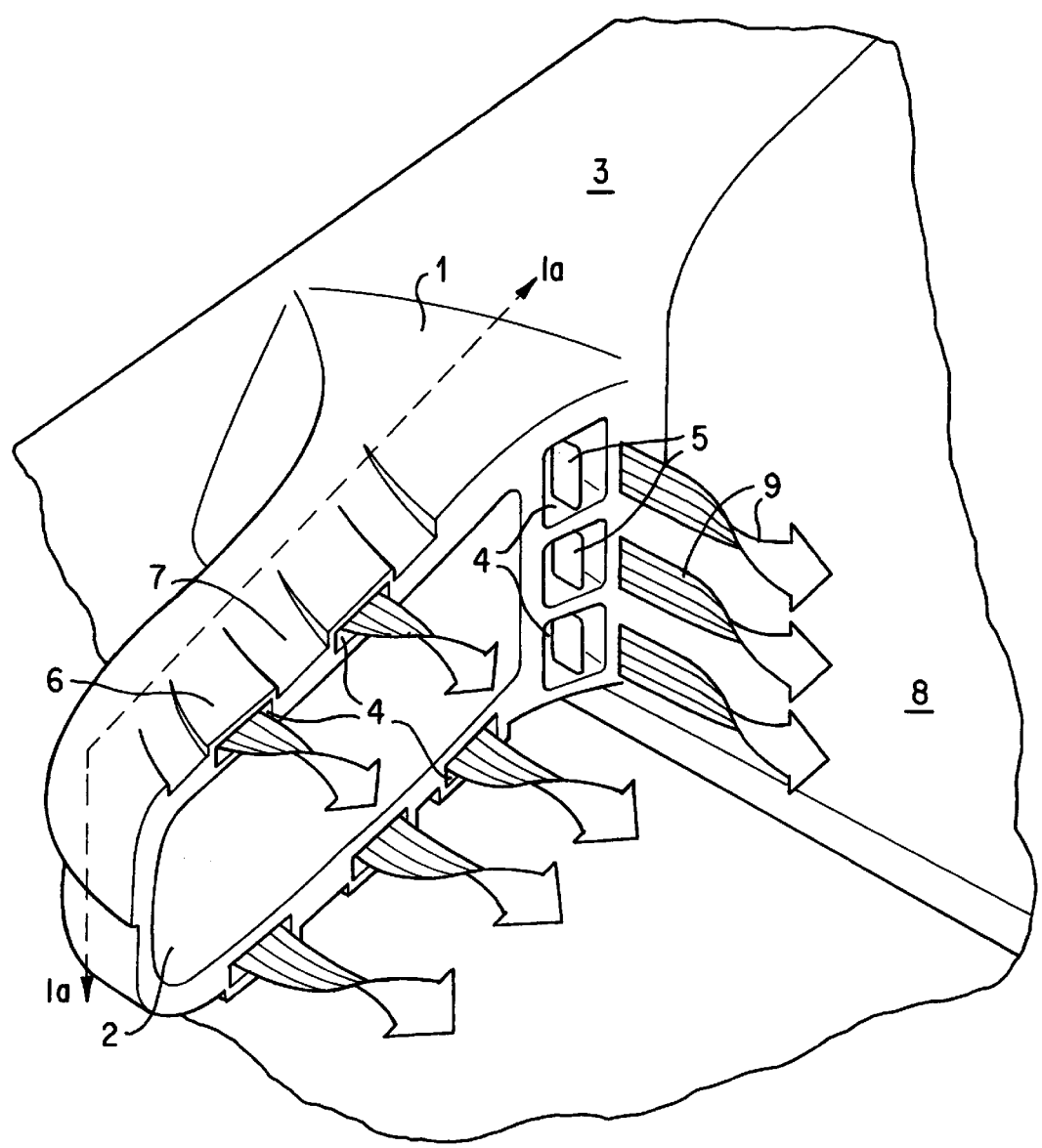
FIG. 1 shows a rear view mirror according to a first preferred embodiment of the present invention, looking in the direction of the mirror glass.
Figure 1A:
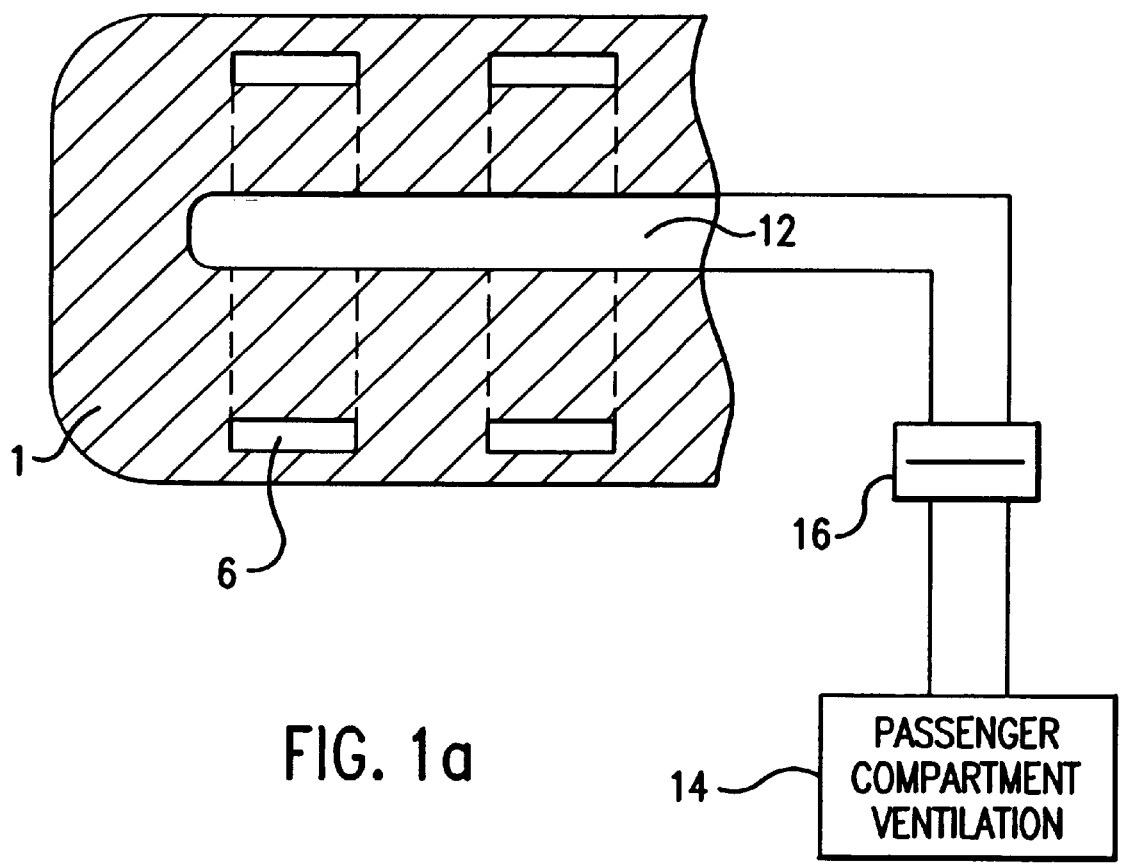
FIG. 1a shows a sectional view of the interior of the mirror housing taken along line Ia—Ia of FIG. 1.

Referring to FIGS. 1, and 1a, a mirror housing 1 with a mirror glass 2 is mounted in the lower front corner area of the window 8 of a vehicle door 3. Mirror housing 1 is provided on its interior with a plurality of interior air guide channels 6 and may include at least one common distribution chamber 12 for the interior air guide channels 6. The interior air guide channels 6 and distribution chamber 12 communicate with an air source, such as the passenger compartment. The air source communicates via the distribution chamber 12 with outlet openings 4 of the interior air guide channels 6. In the embodiment shown in FIGS. 1 and 1a, the ventilated passenger compartment 14 serves as the air source for the interior air guide channels 6. A check valve 16 is provided in the connection between the air guide channels and the passenger compartment 14, so that return flow of air in the direction of the passenger compartment is reliably prevented. In the embodiments according to FIGS. 2 and 3, the wind blast that strikes the front area of the mirror housing is utilized as the air source.

Along the edge of mirror glass 2, separate outlet openings 4 are provided for the interior air guide channels 6. These outlet openings 4 can be provided with air guide devices 5, for example in the form of vanes, in order to allow the air to emerge in directed vorticized air streams. The shape and alignment of the vorticized air streams that emerge from outlet openings 4 is indicated in the drawing by the twisted arrows, which is controlled by the configuration and position of the air guide devices 5.

In the upper and lower areas of mirror housing 1 that lie in the vertical axis of the vehicle as well as in its free vertical external side area, its edge is profiled to form elevations and depressions. The elevations are formed on the exterior surface of the housing exterior of the interior air guide channels 6 that lead to the outlet openings 4 while exterior air guide channels or depressions 7 are located laterally between the interior air guide channels 6. Interior air guide channels 6 and exterior channels/depressions 7 are aligned so that wind blasts can flow through them in the direction of the vorticized air streams to be produced. An important factor for the design of the vorticized air streams is the air flow that results from them, because directed air flows with different air velocities adjoining one another, which favors the formation of vorticized air flows or at least when the latter are produced in the outlet openings 4 by guide devices provided there, are further reinforced in terms of their existence and stability.

The vorticized air streams guided along side window 8 prevent dirt from striking the side window as a result of uncontrolled fluctuating vacuum conditions downstream from the rear view mirror when driving the vehicle in rain and/or under wet road conditions.

Figure 2:
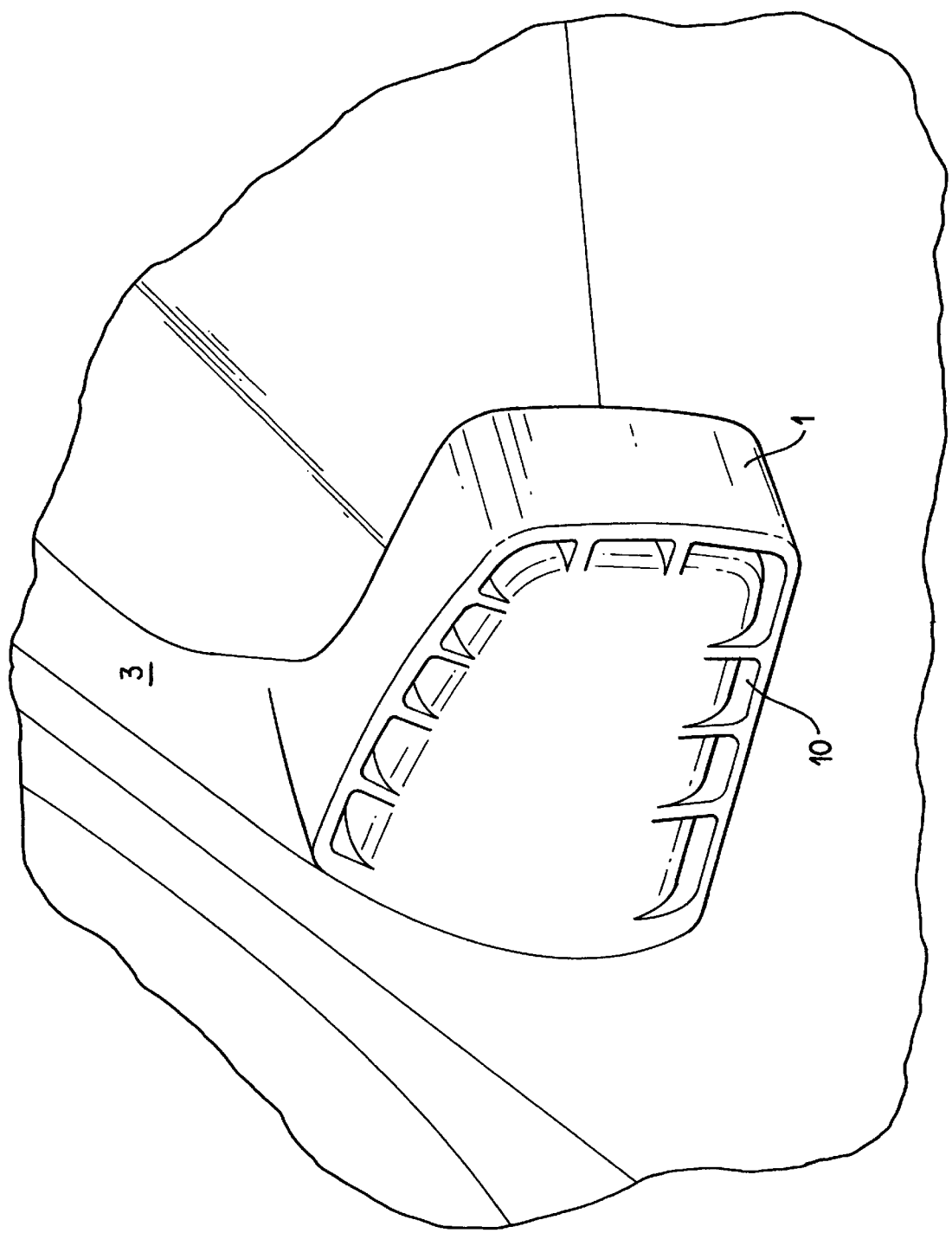
FIG. 2 shows a rear view mirror according to another preferred embodiment, with a view of the surface of the rear view mirror located in front in the direction of travel of the motor vehicle.

In the embodiment according to FIG. 2, mirror housing 1 is provided in the direction of travel, at the front in its free outer marginal area, with air intakes 10 which lead inside mirror housing 1 into a distribution chamber or directly into outlet openings 4.

Figure 3:
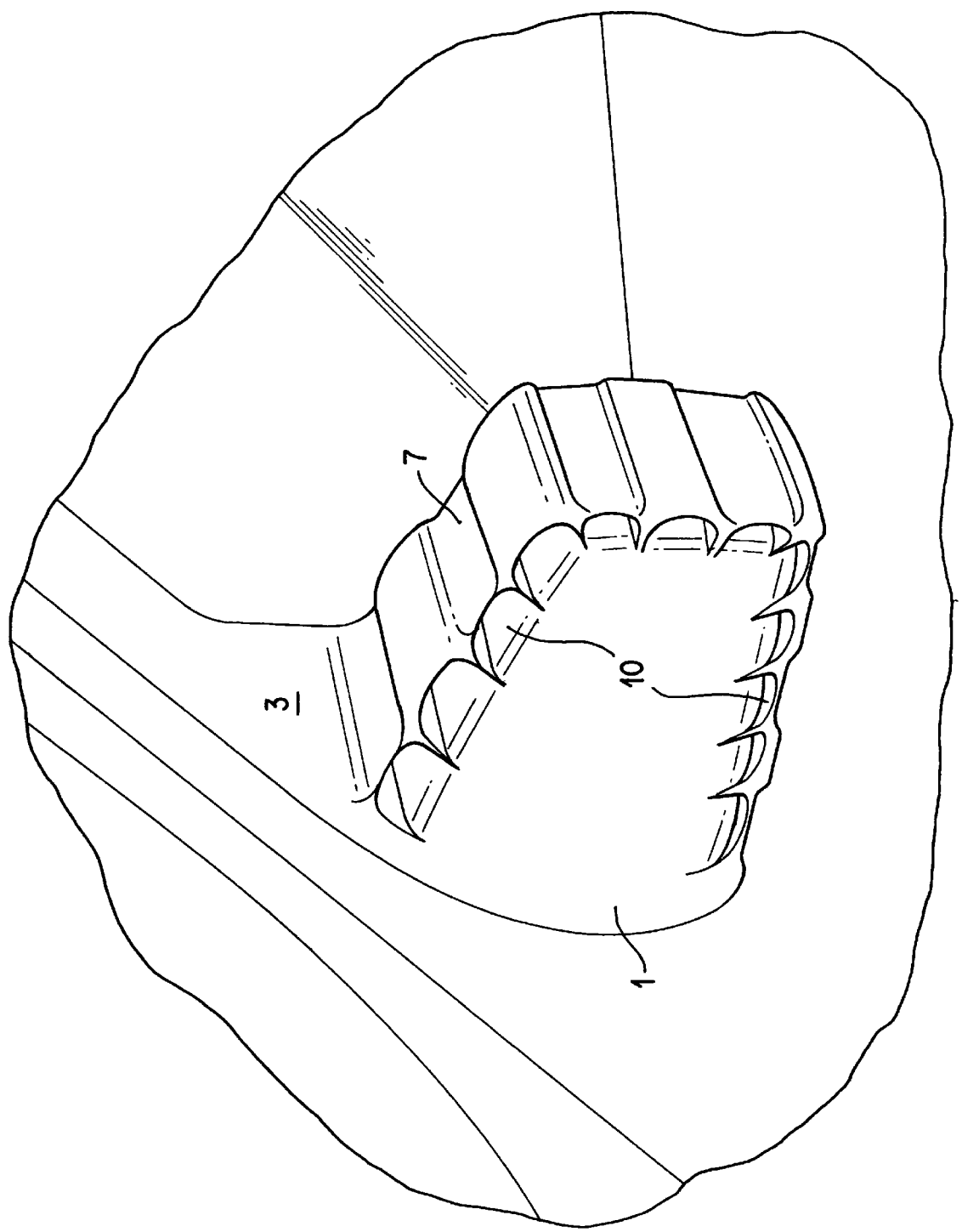
FIG. 3 shows a rear view mirror according to another preferred embodiment, with a view of the surface of the rear view mirror located in front in the direction of travel of the motor vehicle.

In the embodiment according to FIG. 3, in addition to air inlets 10 on the outer edge of mirror housing 1, there are also exterior channels/depressions 7 that each run in the direction of travel according to the design in FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An outside rear view mirror for a vehicle, comprising a housing supporting a mirror glass, a plurality of interior air guide channels within said housing being communicated with an air source and having respective outlets arranged proximate a peripheral edge of the mirror glass, said outlets facing a rearward end of the vehicle, an exterior surface of said mirror housing defining a plurality of exterior channels through which ambient air flows as a result of a forward movement of the vehicle, wherein said interior air guide channels are located laterally between said exterior channels, air flows emerging from the interior air guide channels and the exterior channels being at least partially horizontally adjacent in order to form vorticized air streams emerging from the interior air guide channels.

2. An outside rear view mirror according to claim 1, wherein at least two of said outlets are provided parallel and adjacent vertically, directly abutting a vehicle side window associated with the outside rear view mirror.

3. An outside mirror according to claim 2, wherein the air source is located inside the vehicle.

4. An outside mirror according to claim 1, wherein the air source is located inside the vehicle.

5. An outside rear view mirror according to claim 1, wherein at least a portion of the air source is the internal ventilation of a passenger compartment of the vehicle.

6. An outside rear view mirror according to claim 5, further comprising a one-way valve installed between said passenger compartment and said outlets.

7. An outside mirror according to claim 1, wherein said exterior channels comprise depressions and said interior air guide channels comprise elevations.

8. An outside rear view mirror for a vehicle, comprising:
   a mirror;
   a housing supporting said mirror, said housing including a profile which peripherally surrounds said mirror, said profile defining a plurality of alternately spaced depressions and elevations around at least a portion of said profile, said depressions being exterior air guide channels, said housing defining interior air guide channels inside of said elevations, said interior air guide channels to be communicated with an air source and having respective outlets arranged proximate a peripheral edge of the mirror glass facing rearward.

9. An outside mirror according to claim 8, wherein said profile has a generally rectangular cross-section, including an upper portion, a lower portion, and two transverse portions, and wherein said plurality of alternately spaced depressions and elevations are located along at least said upper portion and said lower portion.

10. A housing for an outside rear view mirror for a vehicle, said housing including a profile for peripherally surrounding said mirror, said profile defining a plurality of alternately spaced depressions and elevations around at least a portion of said profile, said depressions being exterior air guide channels, said housing defining interior air guide channels inside of said elevations, said interior air guide channels to be communicated with an air source and having respective outlets arranged proximate a peripheral edge of the mirror glass facing rearward.

11. A housing according to claim 10, wherein said profile has a generally rectangular cross-section, including an upper portion, a lower portion, and two transverse portions, and wherein said plurality of alternately spaced depressions and elevations are located along at least said upper portion and said lower portion.

\* \* \* \* \*